United States Patent [19]

Glenn

[11] Patent Number: 5,070,220
[45] Date of Patent: Dec. 3, 1991

[54] FLOW-SWITCH CONSTRUCTION

[75] Inventor: Brian J. Glenn, Meriden, Conn.

[73] Assignee: Imo Industries, Inc., Princeton, N.J.

[21] Appl. No.: 657,656

[22] Filed: Feb. 19, 1991

[51] Int. Cl.$^5$ .................. H01H 35/40; H01H 35/38
[52] U.S. Cl. .......................... 200/81.9 M; 200/82 E
[58] Field of Search ............... 200/81.9 R, 81.9 M, 200/82 R, 82 E

[56] References Cited

U.S. PATENT DOCUMENTS

| | | | |
|---|---|---|---|
| 3,896,280 | 7/1975 | Blake | 200/81.9 M |
| 4,962,831 | 10/1990 | Dundas | 200/82 E |
| 4,996,396 | 2/1991 | Smith | 200/81.9 M |

*Primary Examiner*—Harold Broome
*Attorney, Agent, or Firm*—Hopgood, Calimafde, Kalil, Blaustein & Judlowe

[57] ABSTRACT

A flow-sensing configuration embodies straight-through geometry between inlet and outlet ports, all on a single central axis, using reed-switch and magnet technology to produce a logic output. Virtually all parts are of molded plastic, and the inlet and outlet port connections avoid thread formations by providing for sealed insertional reception of standard tubing at these port connections. When thus incorporated into a hydraulic system, the inlet and outlet tubing insertions at the respective ends of the flow sensor inherently retain integrity of flow-sensor assembly into the system. Flexibility of serving specific interface needs of the customer is achieved by using snap-in modular parts at the port connections.

14 Claims, 1 Drawing Sheet

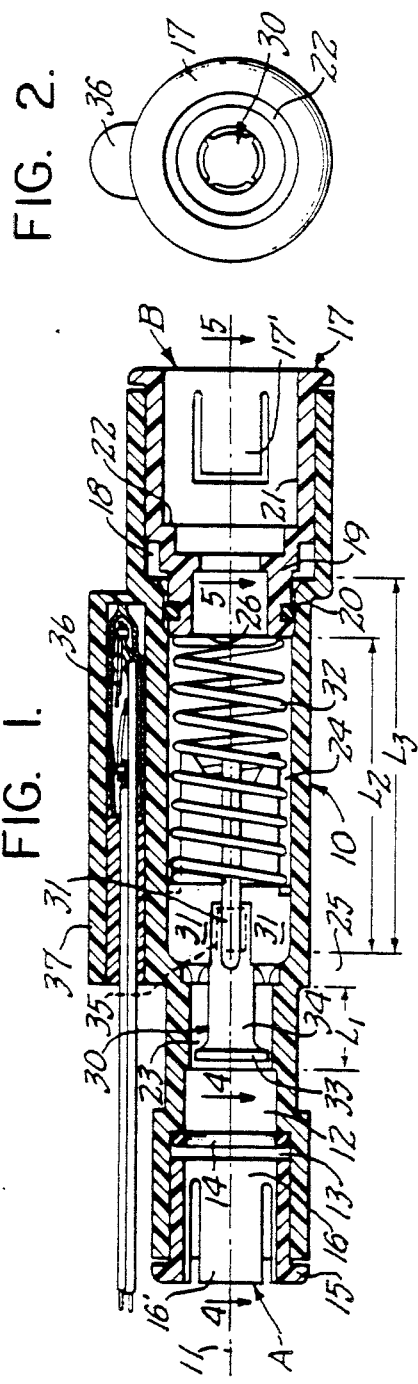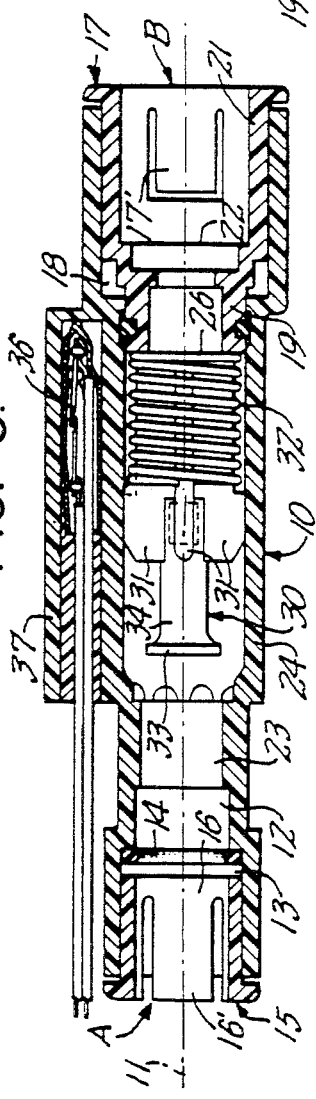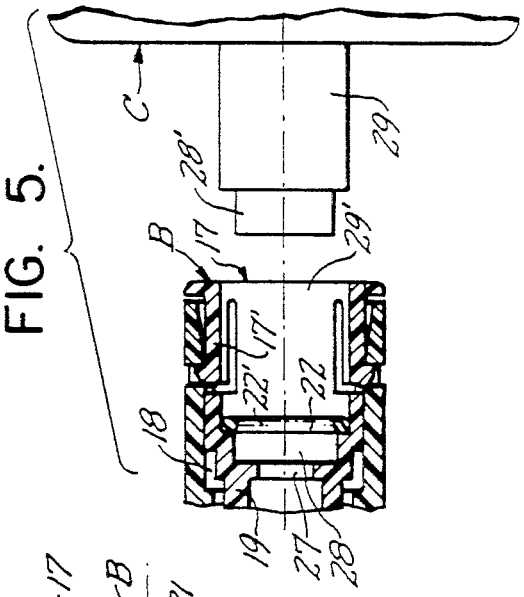

FLOW-SWITCH CONSTRUCTION

BACKGROUND OF THE INVENTION

The invention relates to an improved device for sensing hydraulic flow and providing an electrically switching change of state, upon sensing a flow condition which exceeds a predetermined threshold of flow.

A number of manufacturers today are in the business of custom-designing a variety of flow sensors, wherein a specified sensor-trip point is based on flow rate. In this connection, a customer may choose the kind of connection to be provided, by selecting from a menu list of the commercially available NPT configurations. Such considerations, e.g., as to size, cost and unusual method of connection, all but eliminate any labor-efficient incorporation of a standard product into a process.

BRIEF STATEMENT OF THE INVENTION

It is an object of the invention to provide an improved flow switch construction which is low in cost and of elemental simplicity, having modest, overall envelope requirements, and also having ready adaptability to commercially available tubing, for inclusion in a hydraulic circuit or system.

A specific object is to meet the above object with a relatively miniaturized flow sensor which exhibits ultra-low pressure drop at increased flows, i.e., at flows which are beyond the threshold at which a desired switching change of state occurs.

Another specific object is to meet the above objects with a unit-handling flow-switch construction which requires no threading or soldering mechanical labor when connecting the same into a hydraulic circuit or system.

A further specific object is to meet the above objects with a construction which requires no machining of parts and no thread formations.

The invention achieves these objects in a flow-sensing configuration which embodies straight-through geometry between inlet and outlet ports, all on a single central axis, and using reed-switch and magnet technology to produce a logic output. Virtually all parts are of molded plastic, and the inlet and outlet port connections avoid thread formations by providing for sealed insertional reception of standard tubing at these port connections. When thus incorporated into a hydraulic system, the inlet and outlet tubing insertions at the respective ends of the flow sensor inherently retain integrity of flow-sensor assembly into the system. Flexibility of serving specific interface needs of the customer is achieved by using snap-in modular parts at the port connections.

DETAILED DESCRIPTION

The invention will be described in detail and for a preferred embodiment, in conjunction with the accompanying drawings, in which:

FIG. 1 is a view in vertical section, taken along the central axis of a flow-switch construction of the invention, showing the same in a no-flow or low-flow condition;

FIG. 2 is an end view of the construction of FIG. 1;

FIG. 3 is a view similar to that of FIG. 1, except that parts are shown for a full-flow condition;

FIG. 4 is a fragmentary sectional view taken at 4—4 in FIG. 1; and

FIG. 5 is a fragmentary sectional view taken at 5—5 in FIG. 1, in exploded relation with a fragmentary showing of outlet-port geometry of a utilization device or component to which the flow-switch construction of FIG. 1 can be insertionally assembled.

In the drawings, a flow switch of the invention is shown to be contained by an elongate tubular body 10 having an upstream or inlet-end port A and a downstream or outlet-end port B, all on a central axis 11. The inlet port A comprises an inlet-port bore 12 and counterbore 13, whereby to define a shoulder stop for limiting displacement of an elastomeric O-ring 14. A flanged guide bushing 15 fits counterbore 13 and is shown with a bore 16 which matches the diameter of the inlet-port bore 12, whereby to guide the inserted reception of the end of commercial tubing (not shown) of size to fit bores 12, 16 and to have such yielding interference with O-ring 14 as to establish a full circumferential seal of tubing thus assembled into the inlet-port bore 12; as seen in FIG. 4, bushing 15 is slitted to define diametrically opposed locking fingers 16' to retain its assembly to counterbore 13. An analogous arrangement is depicted at the outlet-port B where a flanged bushing 17 has an outer cylindrical body surface fitted to an outlet-port bore 18 (shown as a counterbore), and bushing 17 has a reduced upstream end 19 that is peripherally grooved to retain an elastomeric O-ring seal 20 to an axially short, circumferentially continuous, radially inwardly open retaining groove for the O-ring 20; as seen in FIG. 5, bushing 17 is slitted to define diametrically opposed locking fingers 17' to retain assembly to the outlet-port bore 18. A stepped counterbore 21 within bushing 17 corresponds to the bore 13 at the inlet end A whereby to define a shoulder 22 for reception of another O-ring 22'. The outlet bushing 17 is internally configured analogously to the bore configuration of inlet bushing 15, in the sense that a bulkhead formation 27 within bushing 17 provides a stop at the inner end of a limited bore 28 for insertional reception (and sealing at 22) of the same-size tubing as is accommodated at the inlet bushing 15; however, as suggested by the fragmentary outline C (FIG. 5) of a customer's outlet-port connecting geometry, the outlet bushing 17 (and therefore the flow switch of the invention) is directly mountable to the customer's existing utilization device C, which is shown to have a reduced outer-end tubular formation 28' of standard tube diameter to fit bore 28 for sealed engagement to O-ring 22', and with a larger-diameter base 29 for guided stabilizing engagement to the counterbore 29' of outlet bushing 17.

Between the inlet-end port bore 12 and the outlet-end port bore 18, a through passage is defined by a primary or "low-flow" cylindrical bore 23 of first diameter and first axial extent $L_1$ and by a secondary or "high-flow" cylindrical bore 24 (a) of greater diameter than said first diameter and (b) of greater axial extent $L_2$ than the axial extent $L_1$; preferably, the sectional area of bore 24 is at least twice that of bore 23. A short transitional zone 25 of graduated connection is shown between bores 23, 24. And despite the effective shortening of bore 24 by reason of the lap of bushing end 19 with bore 24, thereby effectively establishing a shoulder 26 at the downstream end of the "high-flow" bore 24, the resulting effective length $L_3$ of bore 24 still very substantially exceeds the length $L_1$ of bore 23.

In accordance with a feature of the invention a unitary valve-member 30 is integrally formed with angularly spaced struts 31 which derive piloting guidance from the "high-flow" bore 24. The downstream ends of struts 31 are reduced to provide locating support for a compressionally loaded coil spring 32 which derives body reference from shoulder (26) abutment at the downstream end of bore 24. Thus, in the absence of any downstream-directed force, spring 32 positions valve-member 30 at its upstream limit of displaceability, as shown in FIG. 1.

The upstream end of valve member 30 is characterized by a "metering" disc or piston formation 33 integrally formed with a reduced cylindrical stem or body portion 34, and the downstream end of body portion 34 is formed with the radial struts 31. In the absence of any downstream-directed force, the "metering" piston or disc 33 is seen to be positioned near the upstream end of the "low-flow" bore 23; and the "metering" function will be understood to apply for the low flow permitted by a small radial clearance between piston 33 and bore 23, for as long as valve member 30 positions piston 33 in bore 23.

A small permanent magnet 35 is encapsulated in the rear end of body portion 34; and when valve member 30 is subjected to a sufficient downstream displacement against spring 32, magnet 35 is of such field strength as to cause a change of state at a magnetic-reed switch 36, shown sealed within a glass envelope that is in potted assembly within a local elongate housing formation 37 of the body 10. The fully displaced condition of valve member 30 and its magnet 35 is shown in FIG. 3, at which point the magnet 35 will be seen to have actuated switch 36 from its open condition (FIG. 1) to its closed condition (FIG. 3).

Operation of the described flow switch results from liquid flow through body 10 at a specified rate. As the liquid enters the metering or primary bore 23, the metering diameter of piston 33 (i.e., its limited radial clearance in bore 23) presents a flow restriction, the resistive force of which is a function of the preload and characteristic of spring 32. When flow is sufficient to displace piston 33 out of the metering bore, against the force of spring 32, the piston 33 enters the much larger section of secondary bore 24, allowing full and substantially unimpeded larger flows of the liquid. In this connection, it should be noted that the sectional area between struts 31 should at least equal or slightly exceed the sectional area of the primary bore 23, thus assuring against noticeable resistance to flow, once piston 33 has been driven out of the metering bore 23 of body 10. The involved increase in flow will cause piston 33 and therefore the entire valve member 30 to dwell in the high-flow bore 24, with switch 36 actuated, in its magnetically actuated change of state. Liquid can move into and pass through the metering bore 23 unobstructed, pass around the piston 33 in the high-flow bore and exit through the output port. Reducing flow reverses the motion of the piston, returning switch 36 to its off position (FIG. 1) in the course of piston movement back to its rest position.

The described construction will be seen to meet all stated objects and to provide not only the essence of simplicity for effectively snap-in, snap-out assembly to other hydraulic-system connections, without requiring special threads or adaptor fittings, but also, due to flow-through in-line design, to enable least-possible resistance to the larger flow which are caused to bypass the metering piston 33, with electrically switched indication that the threshold condiiton of by-passing high-flow does or does not exist. All of the parts, except the O-rings, magnet 35 and the reed switch with which it coacts, may be of injection-molded plastic construction.

What is claimed is:

1. A flow-switch construction, comprising an elongate tubular body having a central axis between an upstream inlet-port bore and a downstream outlet-port bore, a low-flow cylindrical bore of first diameter and first axial extent communicating with the inlet-port bore, a high-flow cylindrical bore of diameter greater than said first diameter and axial extent greater than said first axial extent, said high-flow bore communicating with the low-flow bore and with the outlet-port bore, a valve-member body having angularly spaced radial strut formations in piloting-guidance relation with said high-flow bore, a valve-member piston and stem integrally formed with said valve-member body, said stem projecting in the upstream direction beyond said strut formations and with relatively great clearance relation to the diameter of the low-flow bore, said stem positioning said piston at the upstream end of said valve-member body and with relatively close clearance relation to the diameter of the low-flow bore, a compressionally preloaded coil spring contained within said high-flow bore and reacting between said valve member body and a shoulder at the downstream end of said high-flow bore, whereby to normally position said piston at a maximum upstream location in the low-flow bore, the axial extent of the high-flow bore exceeding the axial extent of the low-flow bore by an amount sufficient to position said piston entirely within the high-flow bore when said valve-member body is at a maximum location of downstream displacement against said spring, a permanent magnet carried by said valve-member body and a magnetic-reed switch fixedly mounted to said tubular body in external overlap with a portion of the high-flow bore, the effective longitudinal position of said switch being such in relation to the field of said magnet that said switch changes its state upon valve-member-piston traverse of the axial location of change from the low-flow bore to the high-flow bore.

2. The construction of claim 1, in which said switch comprises magnetic-reed contacts within a sealed elongate envelope, and in which said tubular body is of molded plastic material having a longitudinally extending externally accessible bore for insertional accommodation of the envelope of said switch, said switch being in potted permanent assembly to said externally accessible bore.

3. The construction of claim 1, wherein the close clearance relation of said piston to the low-flow bore diameter defines a low-flow sectional area which is greatly exceeded by a high-flow sectional area when said piston is within the high-flow bore, and wherein the sectional area between said struts and within the high-flow bore also greatly exceeds said low-flow sectional area.

4. The construction of claim 3, in which the sectional area of said high-flow bore is at least twice that of said low-flow bore.

5. The construction of claim 1, in which the inlet-port bore includes means to receive and retain an elastomeric O-ring for sealed connection of the upstream end of said construction to an end of conventional hydraulic tubing.

6. The construction of claim 1, in which the outlet-port bore includes means to receive and retain an elastomeric O-ring for sealed connection of the downstream end of said construction to an end of conventional hydraulic tubing.

7. The construction of claim 6, in which said last-defined means comprises a tubular adaptor fitting having a reduced upstream end having telescoped fit to the downstream end of the high-flow bore and defining the shoulder for compressionally loaded reference for said spring.

8. The construction of claim 1, in which a downstream-end portion of said strut formations is to reduced limiting radial extent for internally piloting location of the upstream end of said spring.

9. The construction of claim 5, in which said inlet-port bore includes (a) an axially inner portion which is sized to receive and concentrically locate the inserted end of said tubing, (b) an axially outer counterbore portion which defines a radial-ring seating shoulder at juncture with said axially inner portion, (c) a bushing having the bore diameter of said axially inner portion, said bushing having a cylindrical external surface for insertable concentrically located relation to said counterbore, and (d) interengaging bushing and counterbore formations for axially retaining a bushing-inserted position that is axially short of said seating shoulder to an axial extent which exceeds the radial extent of said seating shoulder.

10. The construction of claim 9, in which said bushing has a radially outward flange at its axially outer end for limiting bushing insertion into the counterbore, to the point of interengagement of said formations.

11. The construction of claim 7, in which said tubular adaptor fitting and said outlet-port bore have interengaging formations for axially retaining the adaptor-inserted position at which said shoulder serves for the compressionally loaded reference of said spring.

12. The construction of claim 11, in which said adaptor fitting has a radialy outward flange at its axially outer end for limiting adaptor insertion into the outlet-port bore to the point of interengagement of said formations and establishment of said compressionally loaded reference.

13. The construction of claim 9, in which interengagement of said formations is a snap-in engagement upon purely axial insertion of said bushing in the inlet-port bore.

14. The construction of claim 11, in which interengagement of said formations is a snap-in engagement upon purely axial insertion of said adaptor fitting in the outlet-port bore.

* * * * *